United States Patent
Igarashi et al.

(10) Patent No.: US 8,496,083 B2
(45) Date of Patent: Jul. 30, 2013

(54) REAR WHEEL SUSPENSION DEVICE OF MOTORCYCLE

(75) Inventors: Makoto Igarashi, Saitama (JP); Toshiaki Takamura, Saitama (JP); Shinji Takayanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 640 days.

(21) Appl. No.: 11/905,137

(22) Filed: Sep. 27, 2007

(65) Prior Publication Data
US 2008/0078602 A1  Apr. 3, 2008

(30) Foreign Application Priority Data

Sep. 29, 2006  (JP) ................................ 2006-269378

(51) Int. Cl.
*B62K 25/04* (2006.01)
(52) U.S. Cl.
CPC ...................................... *B62K 25/04* (2013.01)
USPC ........................................ 180/227; 280/284
(58) Field of Classification Search
USPC .................... 180/219, 227; 280/283–285, 288
See application file for complete search history.

(56) References Cited

U.S. PATENT DOCUMENTS

| | | | | |
|---|---|---|---|---|
| 913,961 | A * | 3/1909 | Levedahl | 280/276 |
| 1,148,707 | A * | 8/1915 | Morley | 280/285 |
| 2,539,490 | A * | 1/1951 | Smith | 180/308 |
| 3,917,313 | A | 11/1975 | Smith et al. | |
| 4,058,181 | A * | 11/1977 | Buell | 180/227 |
| 4,463,964 | A * | 8/1984 | Takayanagi et al. | 280/284 |
| 4,951,791 | A * | 8/1990 | Belil Creixelli | 180/219 |
| 5,306,036 | A * | 4/1994 | Busby | 280/284 |
| 5,908,078 | A * | 6/1999 | Belil Creixell | 180/219 |
| 6,092,823 | A * | 7/2000 | Busby | 280/284 |
| 7,267,351 | B2 * | 9/2007 | Chamberlain et al. | 280/281.1 |
| 2004/0144591 | A1* | 7/2004 | Kuroki et al. | 180/337 |
| 2005/0046145 | A1* | 3/2005 | Chamberlain et al. | 280/284 |
| 2006/0065464 | A1* | 3/2006 | Kofuji | 180/227 |

FOREIGN PATENT DOCUMENTS

| | | |
|---|---|---|
| JP | 57-195992 U | 12/1982 |
| JP | 59-143787 A | 8/1984 |
| JP | 7-98507 A | 10/1995 |

* cited by examiner

*Primary Examiner* — Paul N Dickson
*Assistant Examiner* — Maurice Williams
(74) *Attorney, Agent, or Firm* — Birch, Stewart, Kolasch & Birch, LLP

(57) ABSTRACT

A rear wheel suspension device of a motorcycle has rear end portions of an upper arm member and a lower arm rotatably joined to a knuckle member, which pivotally supports a rear wheel. The rear wheel suspension device can obtain a progressive cushion property while avoiding an increase in the number of parts. At the same time, the rear wheel suspension device can make the acquisition of extra rigidity of the vehicle body frame unnecessary. One end of a rear cushion unit is joined to one of an upper arm member and a lower arm member. A rear end portion of another of the upper arm member and the lower arm member is rotatably joined to a knuckle member in front of a rear wheel support portion of the knuckle member. Another end of the rear cushion unit is joined to one of another arm member and knuckle member.

11 Claims, 10 Drawing Sheets

REAR WHEEL SUSPENSION DEVICE OF MOTORCYCLE

CROSS-REFERENCE TO RELATED APPLICATIONS

This nonprovisional application claims priority under 35 U.S.C. §119(a) on Patent Application No. 2006-269378, filed in Japan on Sep. 29, 2006, the entirety of which is incorporated herein by reference.

BACKGROUND OF THE INVENTION

1. Field of the Invention

The present invention relates to a rear wheel suspension device of a motorcycle in which a rear end portion of an upper arm member, which has a front end portion thereof pivotally supported on a vehicle body frame and extends rearwardly, is rotatably joined to an upper portion of a knuckle member, which pivotally supports a rear wheel. A rear end portion of a lower arm member, which has a front end portion thereof pivotally supported on the vehicle body frame and extends rearwardly, below the upper arm member is rotatably joined to a lower portion of the knuckle member.

2. Background of the Invention

Such a rear wheel suspension device has been known in JP-B-7-98507, for example. However, in the rear wheel suspension device disclosed in the above-mentioned JP-B-7-98507, one end of a rear cushion unit is mounted on a vehicle body frame, another end of the rear cushion unit is mounted on either one of an upper arm member and a lower arm member. Therefore, it is necessary to ensure a large rigidity of a joining portion of one end of the rear cushion unit to the vehicle body frame. In addition, in order to obtain a progressive cushion property, it is necessary to additionally provide the combination of a plurality of link members.

SUMMARY OF THE INVENTION

The present invention has been made under such circumferences and it is an object of the present invention to provide a rear wheel suspension device of a motorcycle which can acquire a progressive cushion property while avoiding an increase in the number of parts and, at the same time, can make the acquisition of extra rigidity of the vehicle body frame unnecessary.

To achieve the above-mentioned object, according to a first aspect of the present invention, in a rear wheel suspension device of a motorcycle in which a rear end portion of an upper arm member, which has a front end portion thereof pivotally supported on a vehicle body frame and extends rearwardly, is rotatably joined to an upper portion of a knuckle member, which pivotally supports a rear wheel, and a rear end portion of a lower arm member, which has a front end portion thereof pivotally supported on the vehicle body frame and extends rearwardly below the upper arm member, is rotatably joined to a lower portion of the knuckle member. One end of a rear cushion unit is joined to either one of the upper arm member and the lower arm member. A rear end portion of another of the upper arm member and the lower arm member is rotatably joined to the knuckle member in front of a rear wheel support portion of the knuckle member. Another end of the rear cushion unit is joined to either one of another arm member and the knuckle member.

Furthermore, according to a second aspect of the present invention, a joining potion of another arm member and the knuckle member is arranged outside an outer periphery of the rear wheel as viewed in a side view.

According to a third aspect of the present invention, another arm member is the lower arm member, and one end of the rear cushion unit which is inclined in the frontward and upward direction is joined to the upper arm member.

According to the first aspect of the present invention, the rear cushion unit is arranged between one of the upper arm member and the lower arm member and one of another arm member and the knuckle member. Hence, it is possible to concentrate the acquisition of rigidity of the vehicle body frame on shaft support portions at the front end portions of the upper arm member and the lower arm members whereby it is possible to make the acquisition of extra rigidity of the vehicle body frame unnecessary. Additionally, it is possible to avoid an increase of the number of parts while obtaining a progressive cushion property without requiring additional parts such as link members.

Furthermore, according to the second aspect of the present invention, the knuckle member can be formed by integrally joining rear wheel support portions which are arranged on both right and left sides of the rear wheel. Hence, it is possible to arrange the rear cushion unit at a center position in the widthwise direction of the vehicle body frame.

Furthermore, according to the third aspect of the present invention, it is possible to set a progressive cushion property which can provide a favorable running property.

Further scope of applicability of the present invention will become apparent from the detailed description given hereinafter. However, it should be understood that the detailed description and specific examples, while indicating preferred embodiments of the invention, are given by way of illustration only, since various changes and modifications within the within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
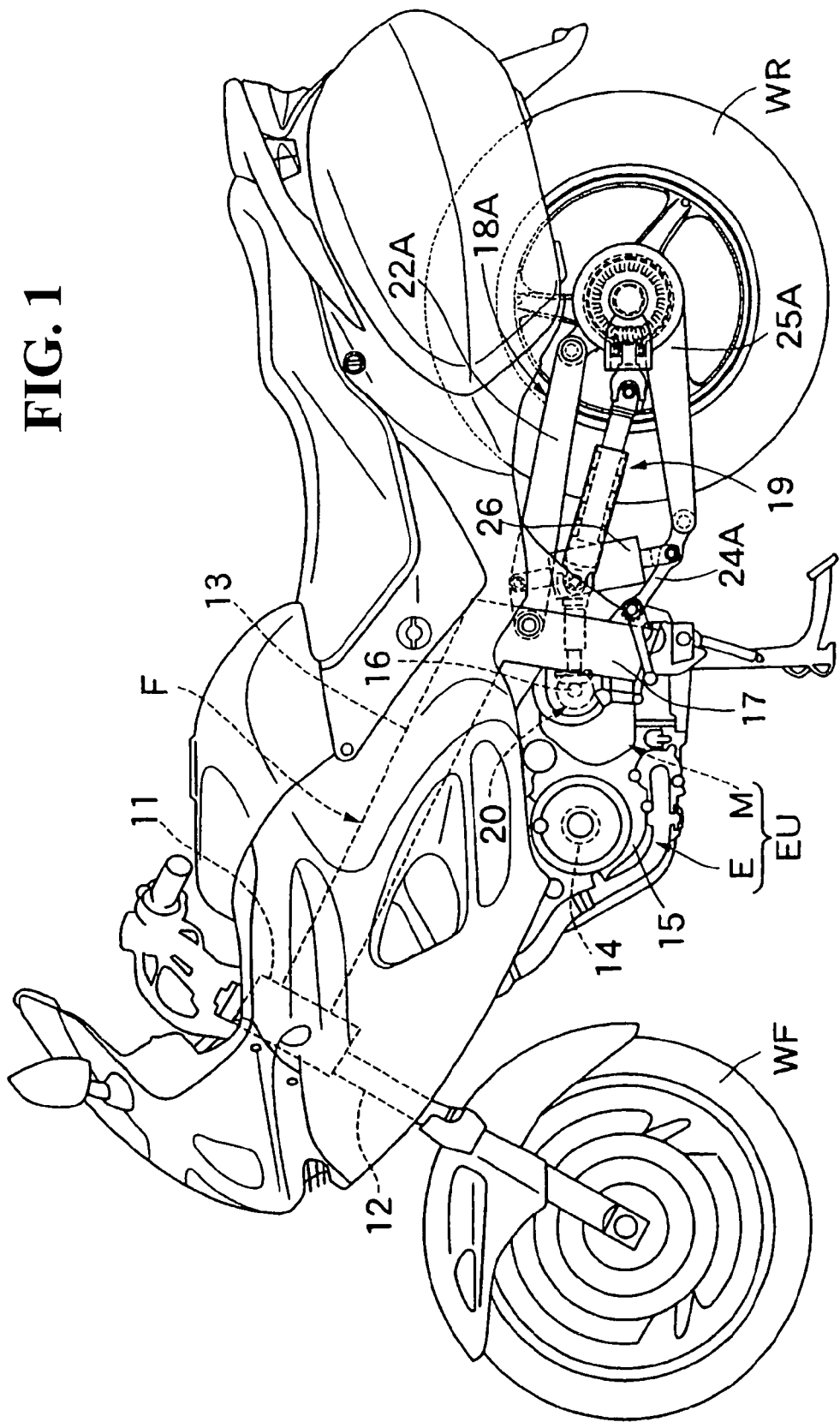
FIG. 1 is a side view of a motorcycle of a first embodiment.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
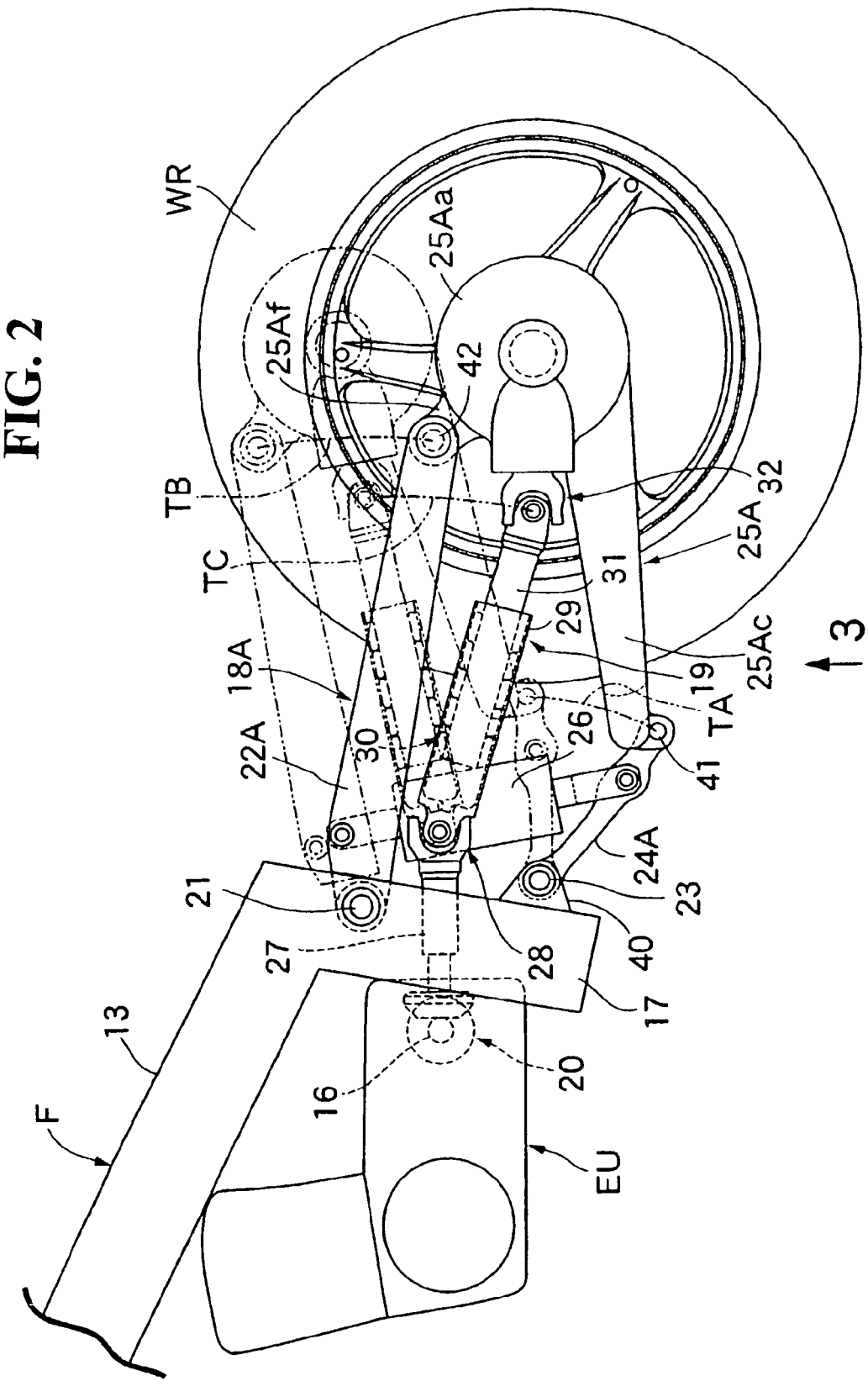
FIG. 2 is an enlarged schematic view of an essential part in FIG. 1 for showing the constitution of a rear wheel drive device and a rear wheel suspension device.
Figure 3:
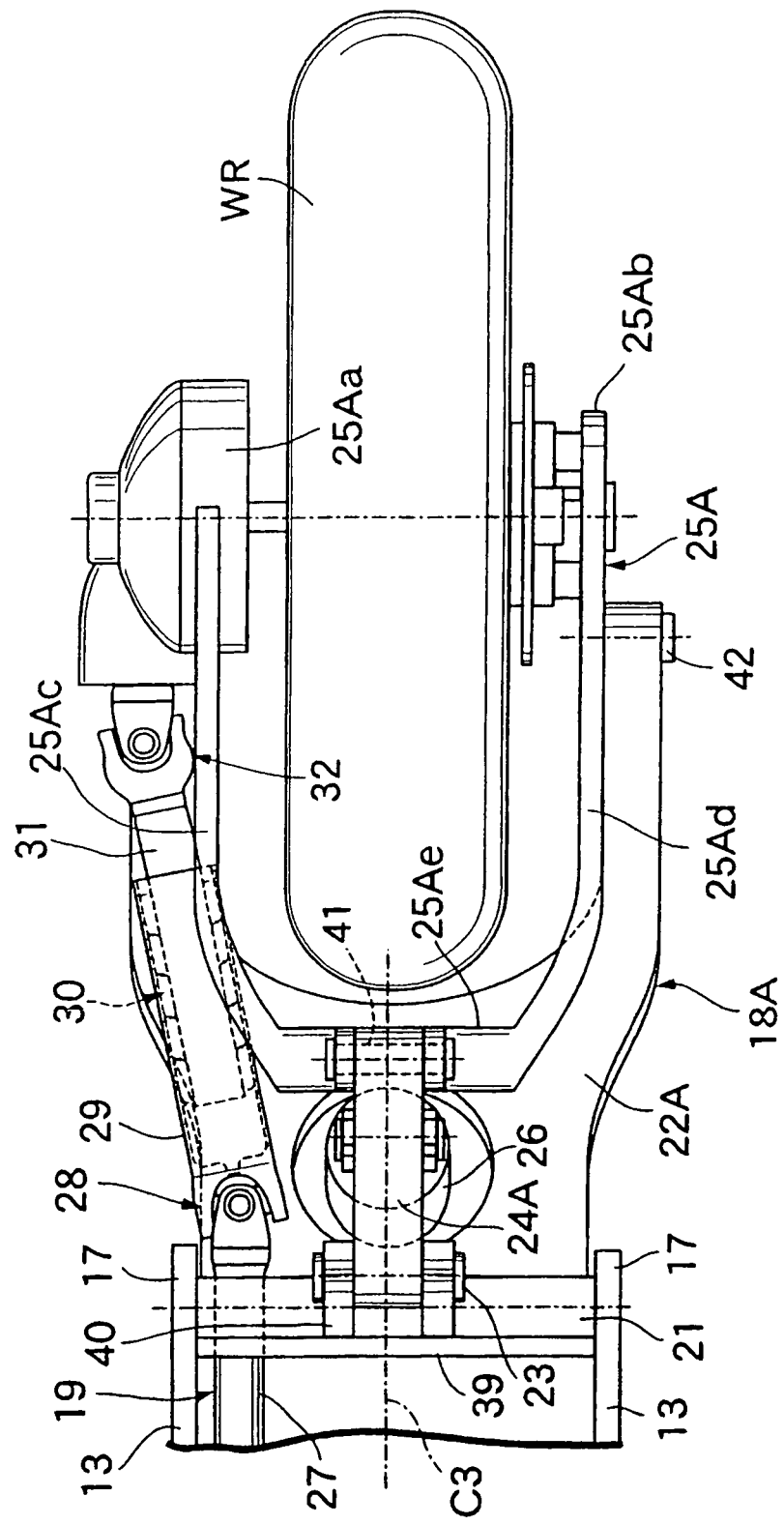
FIG. 3 is a view as viewed in the direction of an arrow 3 in FIG. 2
Figure 4:
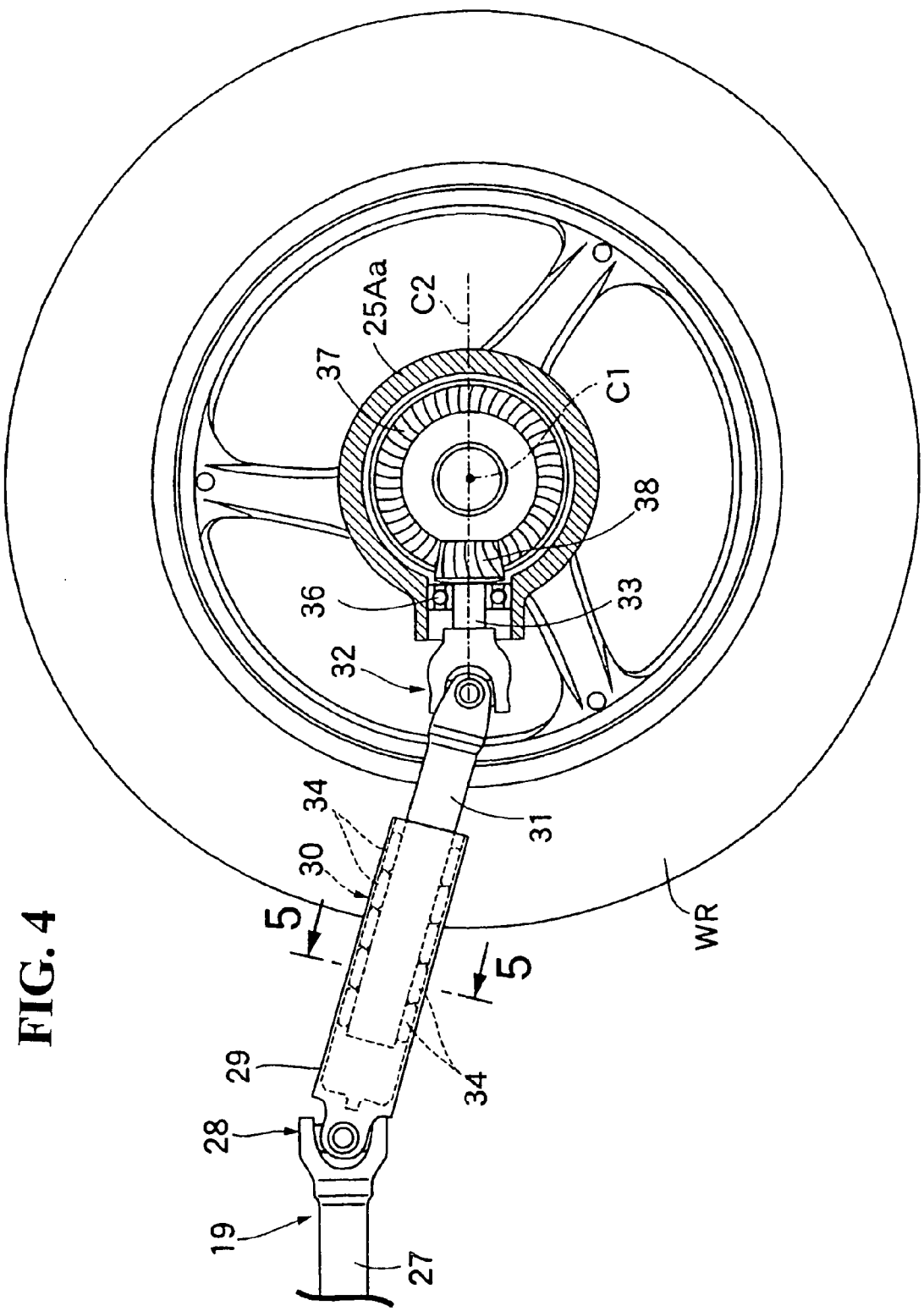
FIG. 4 is a side view with a part broken away showing a rear portion of the rear wheel drive device.
Figure 5:
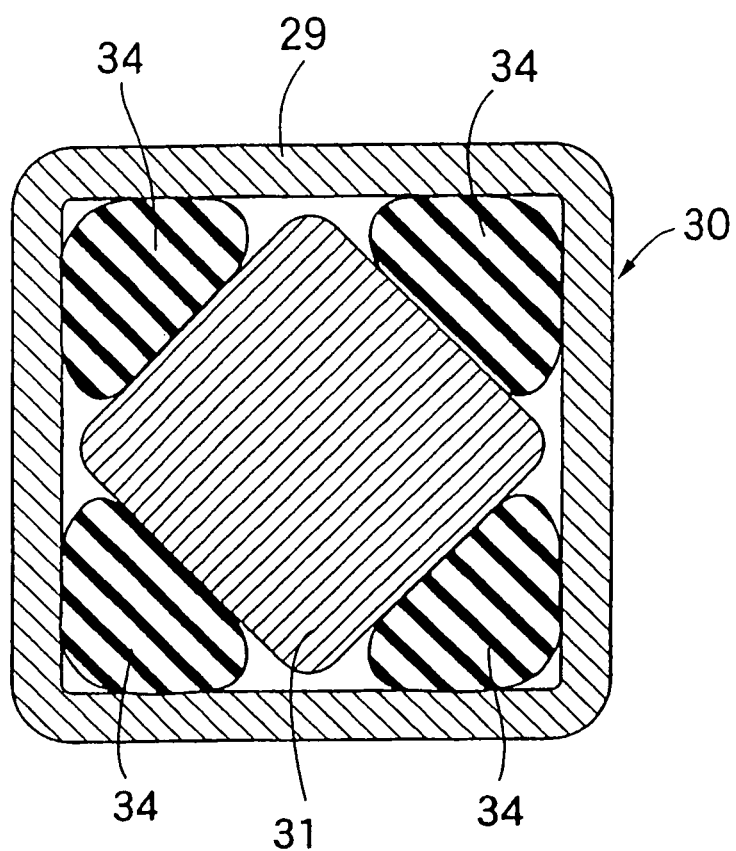
FIG. 5 is a cross-sectional view taken along a line 5-5 in FIG. 4.

FIG. 1 to FIG. 5 are views showing a first embodiment of the present invention, wherein FIG. 1 is a side view of a motorcycle, FIG. 2 is an enlarged schematic view of an essential part in FIG. 1 for showing the constitution of a rear wheel drive device and a rear wheel suspension device, FIG. 3 is a view as viewed in the direction of an arrow 3 in FIG. 2, FIG. 4 is a side view with a part broken away showing a rear portion of the rear wheel drive device, and FIG. 5 is a cross-sectional view taken along a line 5-5 in FIG. 4.

First of all, in FIG. 1, a front fork 12, which pivotally supports a front wheel WF, is steerably supported on a head pipe 11, which is provided to a front end of a vehicle body frame F of the motorcycle. An engine unit EU, which is arranged below a pair of left and right main frames 13, which extend in the rearward and downward direction from the head pipe 11, is mounted on the vehicle body frame F.

The engine unit EU is constituted of an engine E including a crankcase 15, which rotatably supports a crankshaft 14 and a transmission M, which is incorporated in the crankcase 15 for changing a rotational speed of the crankshaft 14. An output shaft 16 having a rotary axis parallel to the crankshaft 14 is rotatably supported on the crankcase 15 behind the crankshaft 14.

Pivot plates 17, which extend in the vertical direction, are integrally connected to rear portions of the main frames 13. The rear wheel WR is joined to the pivot plates 17 by way of a rear wheel suspension device 18A. Furthermore, a rotational force of the output shaft 16 is transmitted to a front end portion of a rear wheel drive shaft 19, which extends in the longitudinal direction, for transmitting power that rotates the rear wheel WR by way of a bevel gear mechanism 20.

In FIG. 2 and FIG. 3, the rear wheel suspension device 18A includes an upper arm member 22A, which has a front end portion thereof pivotally supported on the pivot plates 17 of the vehicle body frame F in a rockable manner by way of a joining shaft 21 and extends rearwardly. A lower arm member 24A has a front end portion thereof pivotally supported on the pivot plates 17 below the joining shaft 21 in a rockable manner by way of a joining shaft 23 and extends rearwardly below the upper arm member 22A. A knuckle member 25A pivotally supports the rear wheel WR and rear end portions of the upper arm member 22A and the lower arm member 24A are respectively rotatably joined thereto. The rear wheel suspension device 18A also includes a rear cushion unit 26.

A rear portion of the upper arm member 22A is bifurcated so as to stride a front upper portion of the rear wheel WR. Furthermore, the knuckle member 25A is integrally formed of rear wheel supports portions 25Aa, 25Ab, which are arranged on both sides of the rear wheel WR for pivotally supporting the rear wheel WR. Arm portions 25Ac, 25Ad respectively extend frontwardly from the respective rear wheel support portions 25Aa, 25Ab. A joining portion 25Ae connects front end portions of the respective arm portions 25Ac, 25Ad. Upper arm portions 25Af project obliquely in the frontward and upward direction from upper portions of the rear wheel support portions 25Aa, 25Ab, while having a length shorter than a length of the arm portions 25Ac, 25Ad. The knuckle member 25A is formed in a substantially U-shape as viewed in a plan view. Furthermore, the rear end portions of the upper arm member 22A are rotatably joined to upper portions of the rear wheel support portions 25Aa, 25Ab by way of joining shafts 42. In the first embodiment, the rear end portions of the upper arm member 22A are rotatably joined to the upper arm portions 25Af, which slightly project obliquely in the upward and frontward direction from the upper portion of the rear wheel support portions 25Aa, 25Ab by way of the joining shafts 42.

Furthermore, brackets 40 are mounted on a support plate 39, which extends between lower portions of the pivot plates 17. A front end portion of the lower arm member 24A is pivotally supported on the brackets 40 in a rockable manner by way of the joining shaft 23. A rear end portion of the lower arm member 24A is rotatably joined to a lower portion of the knuckle member 25A by way of the joining shaft 41. Furthermore, the lower arm member 24A is joined to the knuckle member 25A in front of the rear wheel support portions 25Aa, 25Ab of the knuckle member 25A, and outside an outer periphery of the rear wheel WR. Furthermore, in the first embodiment, the rear end portion of the lower arm member 24A is joined to a center portion of a joining portion 25Ae of the knuckle member 25A by way of the joining shaft 41.

Furthermore, one end of the rear cushion unit 26 is joined to one of the upper arm member 22A and the lower arm member 24A, that is, to the upper arm member 22A in the first embodiment. On the other hand, another end of the rear cushion unit 26 is joined to one of another arm member, that is, the lower arm member 24A and the knuckle member 25A. In the first embodiment, another end of the rear cushion unit 26 is joined to the lower arm member 24A.

Furthermore, the rear cushion unit 26 is inclined in the frontward and upward direction. One end of the rear cushion unit 26 is joined to the upper arm member 22A, while being arranged close to the pivot plates 17 of the vehicle body frame F. Another end of the rear cushion unit 26 is joined to the lower arm member 24A, while being arranged close to the knuckle member 25A.

To explain this embodiment also in conjunction with FIG. 4, the rear wheel drive shaft 19 is constituted of a plurality of shaft members which are joined to each other using one or a plurality of flexible joints. In the first embodiment, the rear wheel drive shaft 19 includes a first shaft member 27, which has a front end portion thereof joined to the output shaft 16 by way of the bevel gear mechanism 20. A second shaft member 29 has a front end portion thereof joined to a rear end portion of the first shaft member 27 by way of a first universal joint 28, which constitutes a first joint. A third shaft member 31 interposes a Neidhart mechanism 30 between the second shaft member 29 and the third shaft member 31. A fourth shaft member 33 has a front end portion thereof joined to a rear portion of the third shaft member 31 by way of a second universal joint 32, which constitutes a second joint.

As shown in FIG. 5, for example, the above-mentioned Neidhart mechanism 30 is configured such that a plurality of columnar resilient members 34, 34 are arranged in series at positions arranged equidistantly in the circumferential direction of the third shaft member 31 between the second shaft member 29 having a rectangular sleeve shape and the third shaft member 31 which is inserted into the second shaft member 31 having a substantially rectangular cross-sectional shape. The Neidhart mechanism 30 absorbs an impact force in the twisting direction of the rear wheel drive shaft 19 during rapid acceleration or deceleration or the like. At the same time, the Neidhart mechanism suppresses twisting vibrations generated by a change of a torque of the engine E or the like.

Furthermore, with respect to the knuckle member 25A, the rear wheel support portion 25Aa, which is arranged on a left side of the rear wheel WR, is formed as a gear housing. Out of the plurality of shaft members 27, 29, 31, 33 which are mounted on the rear wheel drive shaft 19, the fourth shaft member 33 arranged closest the rear wheel WR side projects into the rear wheel support portion 25Aa in a state that an extending line of an axis C2 of the fourth shaft member 33 passes a rotational axis C1 of the rear wheel WR. For example, a ball bearing 36 is interposed between the rear wheel support portion 25Aa and the fourth shaft member 33.

In the inside of the rear wheel support portion 25Aa, a ring gear 37 which is coaxially fixed to the rear wheel WR is housed. A power transmission gear 38, which is fixedly mounted on a rear end portion of the fourth shaft member 33, is meshed with the ring gear 37. In the FIG. 4 embodiment, the ring gear 37 and the power transmission gear 38 are formed of bevel gears.

In such a rear wheel suspension device 18A and a rear wheel drive shaft 19, as indicated by a chained line in FIG. 2, the joining shaft 41, which connects the rear end portion of the lower arm member 24A and the lower portion of the knuckle member 25A, is displaced so as to draw an arcuate trajectory TA about an axis of the joining shaft 23. At the same time, the joining shaft 42, which connects the rear end portion of the upper arm member 22A and the upper portion of the knuckle member 25A, is displaced so as to draw an arcuate trajectory TB about an axis of the joining shaft 21. Corresponding to the above-mentioned displacements, a joining point of the second universal joint 32 between the third shaft member 31 and the fourth shaft member 33 is displaced so as to draw a trajectory TC. Furthermore, the rear wheel drive shaft 19 is rocked such that the joining point of the second universal joint 32 draws a substantially arcuate control about the joining point of the first universal joint 28 between the first shaft member 27 and the second shaft member 29. The rear wheel drive shaft 19 draws a substantially arcuate trajectory and hence, a slide mechanism may be omitted.

Next, to explain the manner of operation of the first embodiment, in the rear wheel suspension device 18, which suspends the rear wheel WR, the rear end portion of the upper arm member 22A, which has the front end portion thereof pivotally supported on the pivot plates 17 of the vehicle body frame F and extends rearwardly, is rotatably joined to the upper portion of the knuckle member 25A, which pivotally supports the rear wheel WR. The rear end portion of the lower arm member 24A, which has the front end portion thereof pivotally supported on the pivot plates 17 and extends rearwardly below the upper arm member 22A, is rotatably joined to the lower portion of the knuckle member 25A. One end of the rear cushion unit 26 is joined to the upper arm member 22A. The rear end portion of the lower arm member 24A is rotatably joined to the knuckle member 25A in front of the rear wheel support portion 25Aa of the knuckle member 25A. Another end of the rear cushion unit 26 is joined to the lower arm member 24A.

Due to the rear wheel suspension device 18A having such a constitution, it is possible to concentrate the acquisition of rigidity of the vehicle body frame F on the shaft support portions of the front end portions of the upper arm member 22A and the lower arm member 24A. Hence, it is possible to make the acquisition of extra rigidity of the vehicle body frame F unnecessary. Additionally, it is possible to avoid an increase in the number of parts, while obtaining a progressive cushion property without requiring additional parts such as link members.

Furthermore, the joining portion of the lower arm member 24A and the knuckle member 25A is arranged outside the outer periphery of the rear wheel WR as viewed in a side view. Hence, the knuckle member 25A can be formed by integrally joining the rear wheel support portions 25Aa, 25Ab, which are arranged on both right and lefts sides of the rear wheel WR, whereby it is possible to arrange the rear cushion unit 26 at the center position C3 (see FIG. 3) in the lateral direction of the vehicle body frame F.

Furthermore, one end of the rear cushion unit 26, which is inclined in the frontward and upward direction, is joined to the upper arm member 22A. Another end of the rear cushion unit 26 is joined to the lower arm member 24A. Hence, it is possible to set a progressive cushion property, which can provide a favorable running property.

Furthermore, the rear wheel drive shaft 19 is constituted of the first to fourth shaft members 27, 29, 31, 33, which are joined to each other using two flexible universal joints 28, 32. Hence, it is possible to enhance the degree of freedom in designing of the rear wheel drive shaft 19. Additionally, with the use of the universal joints 28, 32, the rear wheel drive shaft 19 can be formed at a low cost and, at the same time, it is possible to prevent the rear wheel drive shaft 19 from becoming bulky.

Figure 6:
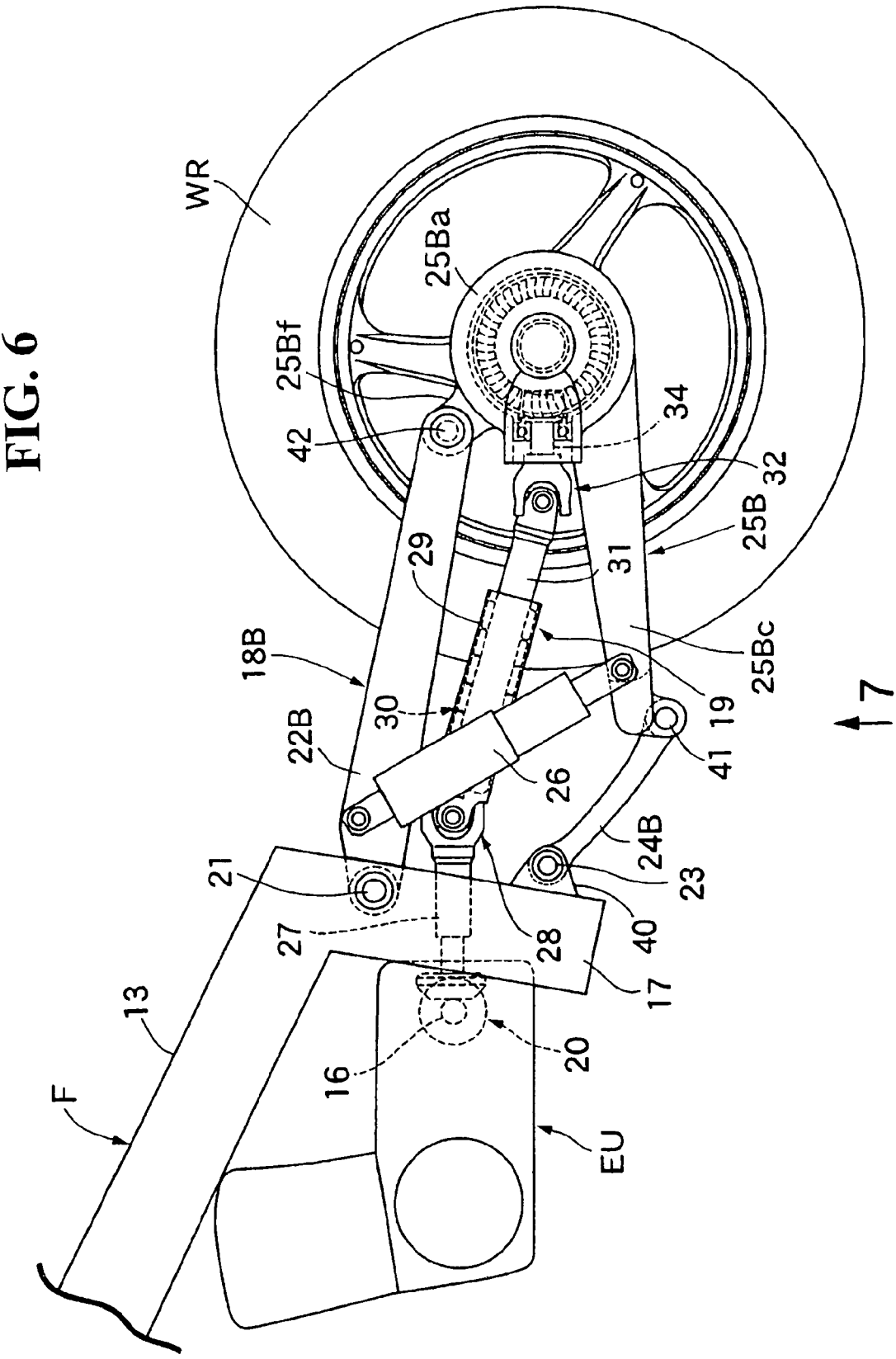
FIG. 6 is a side view corresponding to FIG. 2 of the first embodiment showing a second embodiment.
Figure 7:
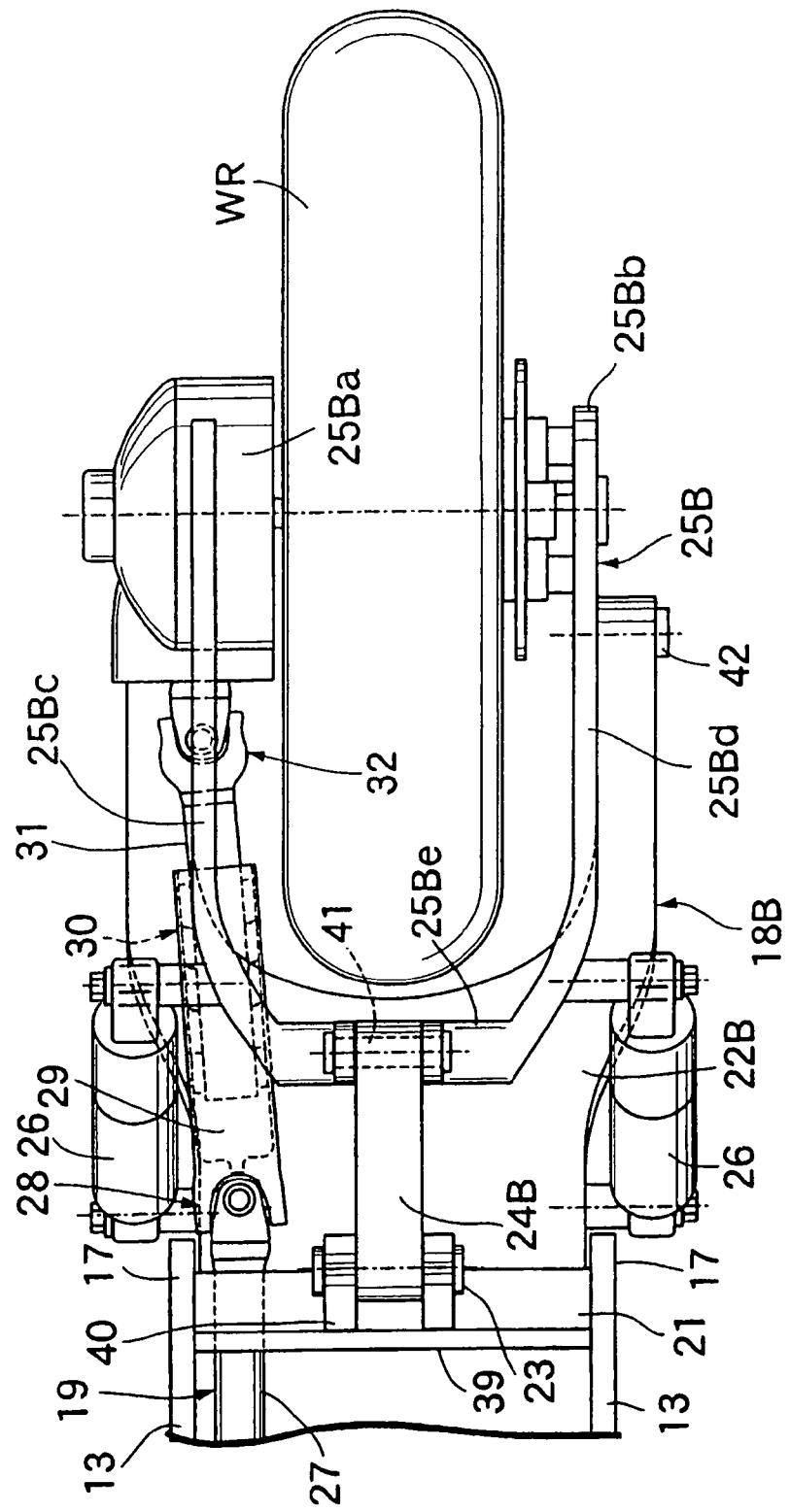
FIG. 7 is a view as viewed in the direction of an arrow 7 in FIG. 6.

FIG. 6 and FIG. 7 show a second embodiment of the present invention, wherein FIG. 6 is a side view corresponding to FIG. 2 of the first embodiment and FIG. 7 is a view as viewed in the direction of an arrow 7 in FIG. 6. In explaining the second embodiment hereinafter, parts corresponding to the parts described in the first embodiment are given the same symbols and the detailed explanation thereof is omitted.

A rear wheel WR is joined to pivot plates 17 of a vehicle body frame F by way of a rear wheel suspension device 18B. The rear wheel suspension device 18B includes an upper arm member 22B, which has a front end portion thereof pivotally supported on the pivot plates 17 of the vehicle body frame F in a rockable manner by way of a joining shaft 21 and extends rearwardly. A lower arm member 24B has a front end portion thereof pivotally supported on the pivot plates 17 below the joining shaft 21 in a rockable manner by way of a joining shaft 23 and extends rearwardly below an upper arm member 22B. A knuckle member 25B pivotally supports the rear wheel WR and rear end portions of the upper arm member 22B and the lower arm member 24B are respectively rotatably joined thereto. The rear wheel suspension device 18B also includes a pair of rear cushion units 26, 26.

A rear portion of the upper arm member 22B is bifurcated so as to stride a front upper portion of the rear wheel WR. Furthermore, the knuckle member 25B is integrally formed of rear wheel supports portions 25Ba, 25Bb, which are arranged on both sides of the rear wheel WR for pivotally supporting the rear wheel WR. Arm portions 25Bc, 25Bd respectively extend frontwardly from the respective rear wheel support portions 25Ba, 25Bb. A joining portion 25Be connects front end portions of the respective arm portions 25Bc, 25Bd. Upper arm portions 25Bf project obliquely in the frontward and upward direction from upper portions of the rear wheel support portions 25Ba, 25Bb, while having a length shorter than a length of the arm portions 25Bc, 25Bd. The knuckle member 25B is formed in a substantially U-shape as viewed in a plan view. Furthermore, the rear end portions of the upper arm member 22B are rotatably joined to upper portions of the rear wheel support portions 25Ba, 25Bb by way of joining shafts 42. In the second embodiment, the rear end portions of the upper arm member 22B are rotatably joined to the upper arm portions 25Bf, which slightly project obliquely in the upward and frontward direction from the upper portions of the rear wheel support portions 25Ba, 25Bb by way of the joining shafts 42.

Furthermore, a front end portion of the lower arm member 24B is pivotally supported on brackets 40, which are mounted on a support plate 39 arranged between the pivot plates 17 by way of the joining shaft 23 in a rockable manner. A rear end portion of the lower arm member 24B is rotatably joined to a lower portion of the knuckle member 25B by way of the joining shaft 41. Furthermore, the lower arm member 24B is joined to the knuckle member 25B in front of the rear wheel support portions 25Ba, 25Bb of the knuckle member 25B and outside an outer periphery of the rear wheel WR. Furthermore, in the second embodiment, the rear end portion of the lower arm member 24B is joined to a center portion of a joining portion 25Be of the knuckle member 25B by way of the joining shaft 41.

Furthermore, one ends of the rear cushion units 26, 26 are joined to one of the upper arm member 22B and the lower arm member 24B, that is, to both side portions of the upper arm member 22B in the second embodiment. On the other hand, another ends of the rear cushion units 26 are joined to one of another arm member, that is, the lower arm member 24B and the knuckle member 25B. In the second embodiment, another ends of the rear cushion units 26 are joined to the knuckle member 25.

Furthermore, the rear cushion unit 26 is inclined in the frontward and upward direction. One ends of the rear cushion units 26 are joined to the both side portions of the upper arm member 22B, while being arranged close to the pivot plates 17 of the vehicle body frame F. Another ends of the rear cushion units 26 are joined to the both side portions of the both arm portions 25Bc, 25Bd of the knuckle member 25B, which are arranged close to the lower arm member 24B.

Furthermore, in the knuckle member 25B, the rear wheel support member 25Ba, which is arranged on a left side of the rear wheel WR, is constituted as a gear housing. The fourth shaft member 33 of the rear wheel drive shaft 19 is rotatably projected into the rear wheel support portion 25Ba.

The second embodiment can also obtain substantially the same advantageous effects as the first embodiment.

Figure 8:
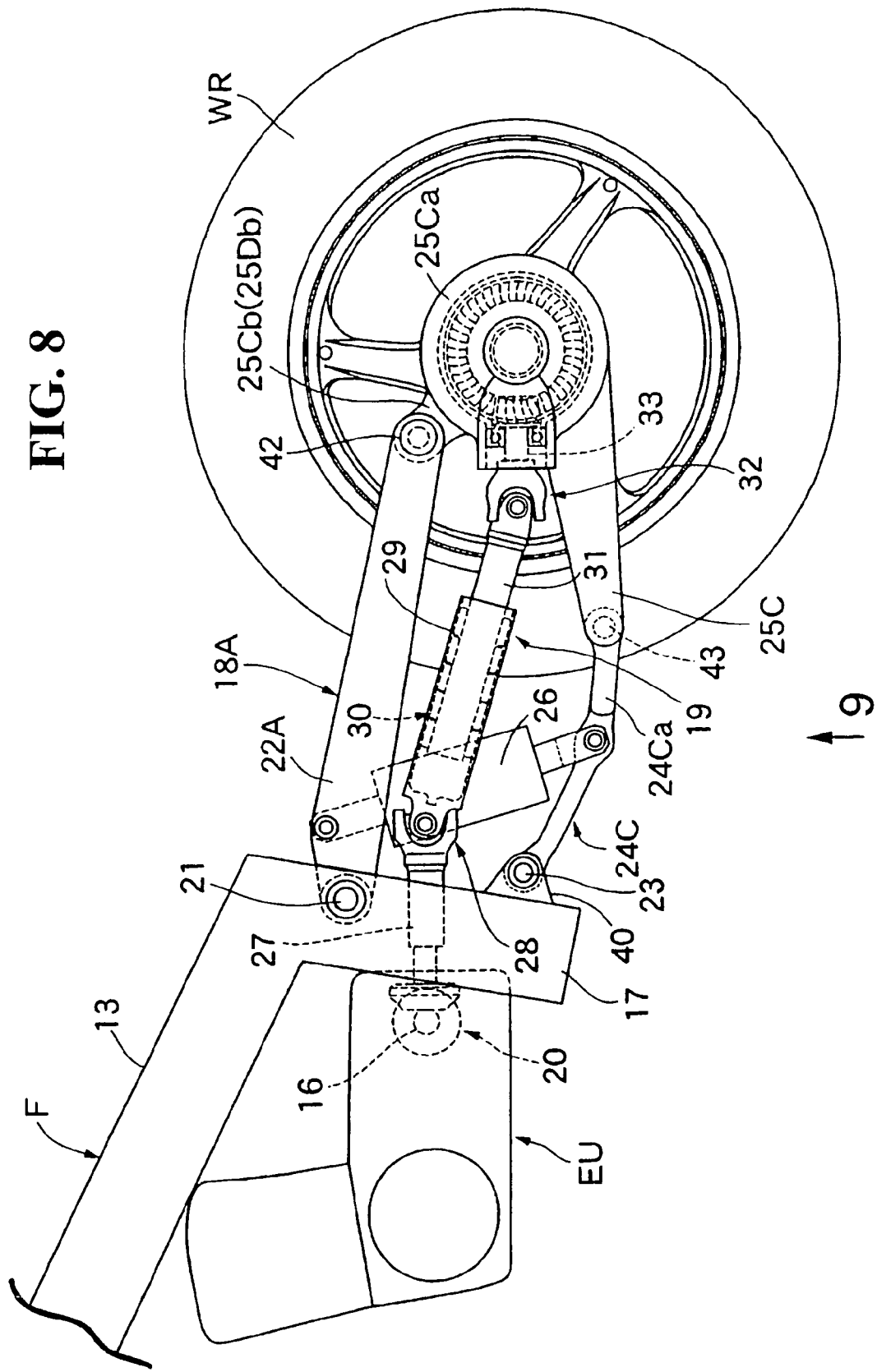
FIG. 8 is a side view corresponding to FIG. 2 of the first embodiment showing a third embodiment.
Figure 9:
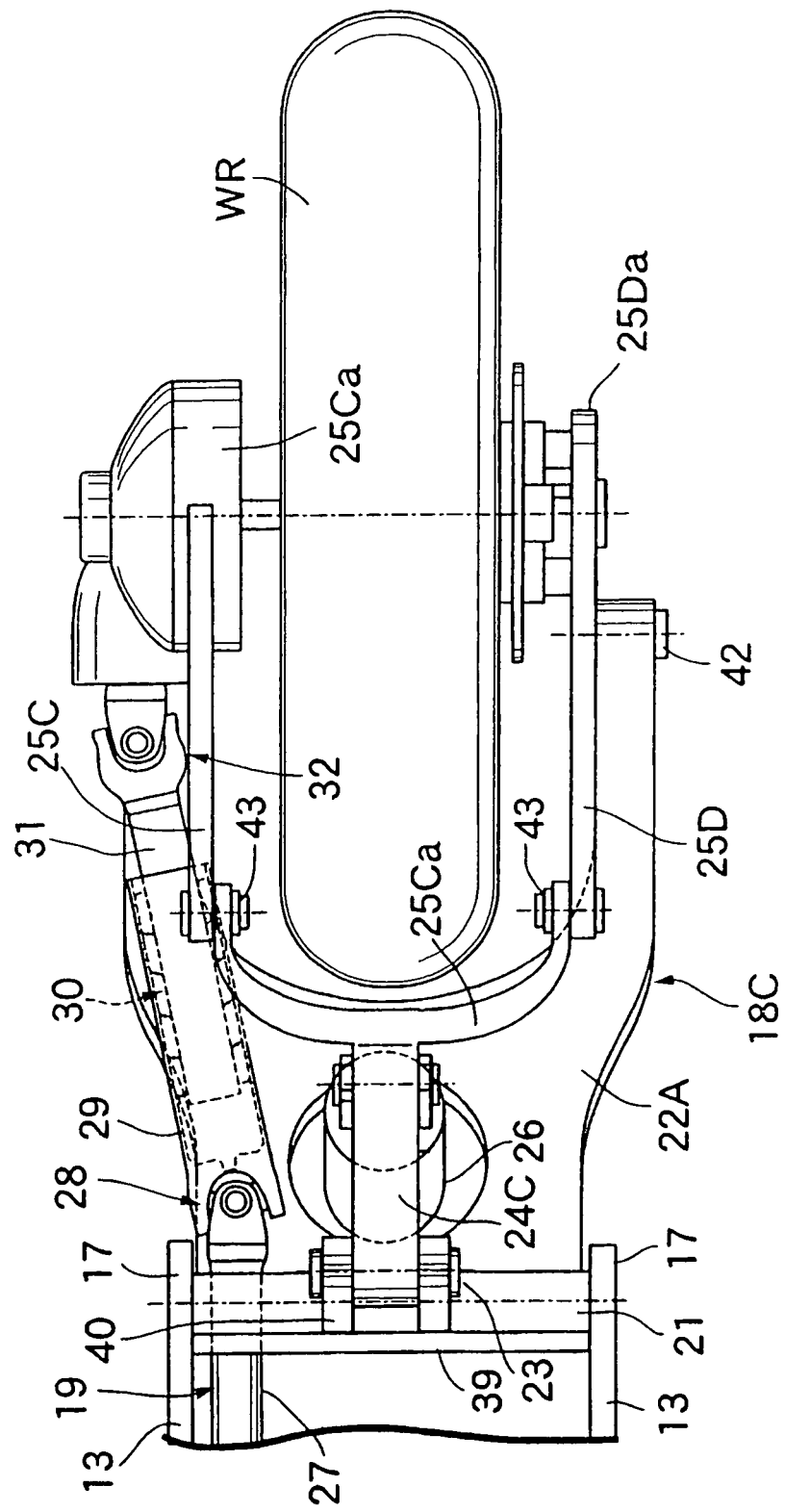
FIG. 9 is a view as viewed in the direction of an arrow 9 in FIG. 8.

FIG. 8 and FIG. 9 show a third embodiment of the present invention, wherein FIG. 8 is a side view corresponding to FIG. 2 of the first embodiment and FIG. 9 is a view as viewed in the direction of an arrow 9 in FIG. 8.

In explaining the third embodiment hereinafter, parts corresponding to the parts shown in the first embodiment and the second embodiment are given the same symbols and the detailed explanation thereof is omitted.

A rear wheel WR is joined to pivot plates 17 of a vehicle body frame F by way of a rear wheel suspension device 18C. The rear wheel suspension device 18C includes an upper arm member 22A, which has a front end portion thereof pivotally supported on the pivot plates 17 of the vehicle body frame F in a rockable manner by way of a joining shaft 21 and extends rearwardly. A lower arm member 24C has a front end portion thereof pivotally supported on the pivot plates 17 below the joining shaft 21 in a rockable manner by way of a joining shaft 23 and extends rearwardly below the upper arm member 22A. A pair of left and right knuckle members 25C, 25D pivotally support the rear wheel WR and rear end portions of the upper arm member 22A and the lower arm member 24C are respectively rotatably joined thereto. The rear wheel suspension device 18C also includes rear cushion units 26.

A rear portion of the upper arm member 22A is bifurcated so as to stride a front upper portion of the rear wheel WR. Furthermore, a knuckle member 25C is arranged on a left side of the rear wheel WR, while having a rear wheel support portion 25Ca, which supports the rear wheel WR on a rear portion thereof. A knuckle member 25D is arranged on a right side of the rear wheel WR, while having a rear wheel support member 25Da that supports the rear wheel WR on a rear portion thereof. A rear end portion of the upper arm member 22A is rotatably joined to upper portions of the knuckle members 25C, 25D, which are arranged on both sides of the rear wheel WR by way of the joining shaft 42. Furthermore, in the third embodiment, the knuckle members 25C, 25D integrally include upper arm portions 25Cb, 25Db, which slightly project obliquely in the frontward and upward direction from upper portions of the rear wheel support portions 25Ca, 25Da. The rear end portion of the upper arm member 22A is rotatably joined to the upper arm portions 25Cb, 25Db by way of the joining shafts 42.

Furthermore, a front end portion of the lower arm member 24C is pivotally supported on a bracket 40, which is mounted on a support plate 39 arranged between the pivot plates 17 by way of the joining shaft 23 in a rockable manner. The lower arm member 24C is rotatably joined to lower portions of both knuckle members 25C, 25D by way of the joining shafts 43, 43. That is, a joining arm portion 24Ca, which extends to a front end side of both knuckle members 25C, 25D that form the rear wheel support portions 25Ca, 25Da on rear portions thereof, is integrally formed on the rear portion of the lower arm member 24C. The joining arm portion 24Ca is rotatably joined to front end portions of both knuckle members 25C, 25D by way of the joining shafts 43, 43.

Furthermore, one ends of the rear cushion units 26, 26 are joined to one of the upper arm member 22A and the lower arm member 24C, that is, the upper arm member 22A in the third embodiment. On the other hand, another ends of the rear cushion units 26 are joined to one of another arm member, that is, the lower arm member 24C and the knuckle member 25C. In the third embodiment, another ends of the rear cushion units 26 are joined to the lower arm member 24C.

Furthermore, a rear cushion unit 26 is inclined in the frontward and upward direction. One ends of the rear cushion units 26 are joined to both side portions of the upper arm member 22A, while being arranged close to the pivot plates 17 of the vehicle body frame F. Another ends of the rear cushion units 26 are joined to portions of the lower arm member 24C, which are arranged close to the joining arm portion 24Ca.

Furthermore, a rear wheel support portion 25Ca of the knuckle member 25C is constituted as a gear housing. A fourth shaft member 33 of a rear wheel drive shaft 19 rotatably projects into the rear wheel support portion 25Ca.

According to the third embodiment, except for the structure that the knuckle members 25C, 25D, which are arranged on both left and right sides of the rear wheel WR are not integrally joined to each other, the third embodiment can obtain substantially the same advantageous effect as the first and second embodiments.

Figure 10:
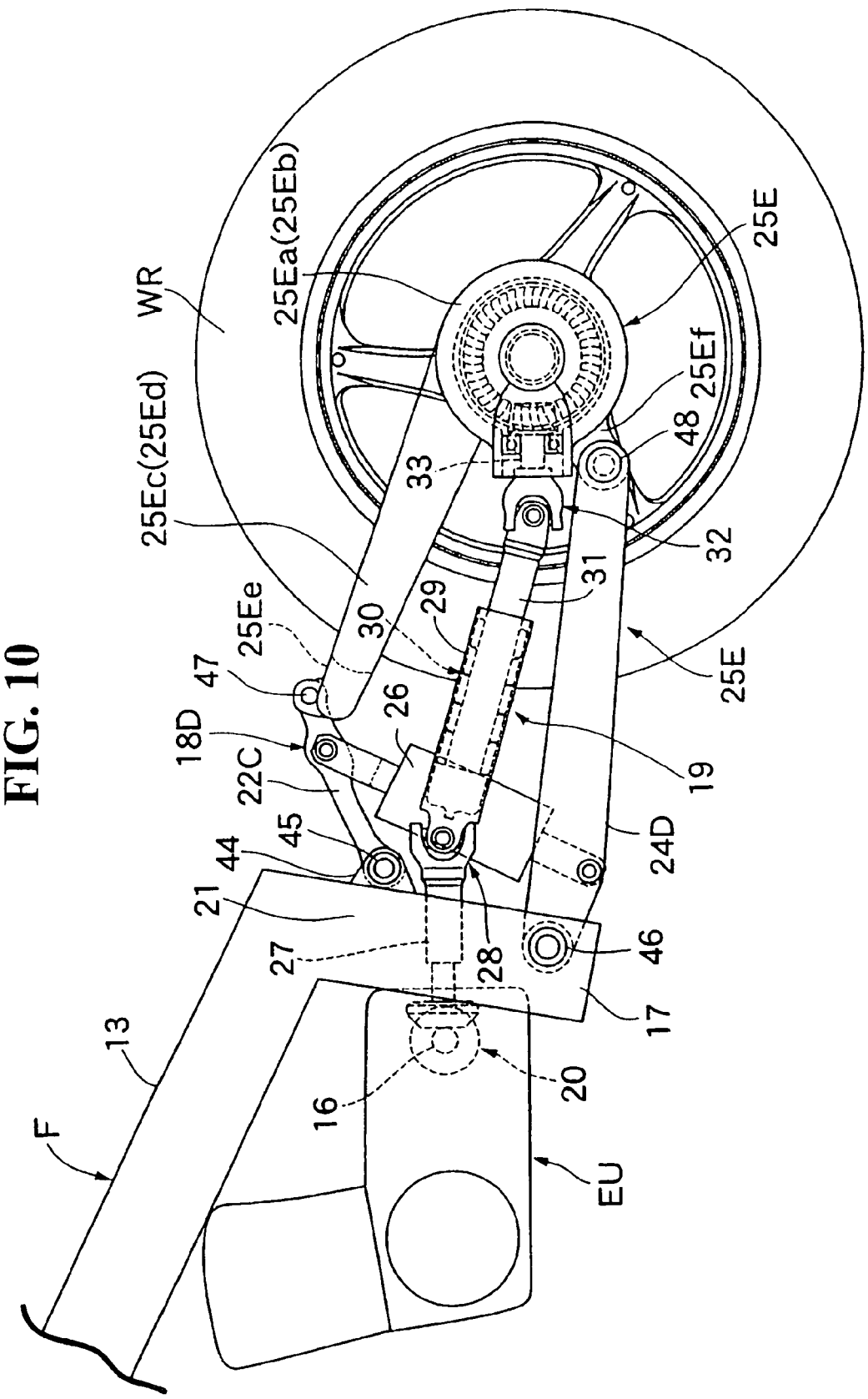
FIG. 10 is a view corresponding to FIG. 2 of the first embodiment showing a fourth embodiment.

FIG. 10 shows a fourth embodiment of the present invention, and in the drawing, parts corresponding to the parts shown in the first to third embodiments are given the same symbols and the detailed explanation thereof is omitted.

A rear wheel WR is joined to pivot plates 17, which are mounted on rear portions of a main frames 13 by way of a rear wheel suspension device 18D. The rear wheel suspension device 18D includes an upper arm member 22C, which has a front end portion thereof pivotally supported on brackets 44 mounted on the upper portions of the pivot plates 17 by way of joining shaft 45 in a rockable manner and extends rearwardly. A lower arm member 24D has a front end portion thereof pivotally supported on the pivot plates 17 by way of a joining shaft 46 in a rockable manner below the joining shaft 45 and extends rearwardly below an upper arm member 22C. A knuckle member 25E pivotally supports a rear wheel WR and rear end portions of the upper arm member 22C and a lower arm member 24D are respectively rotatably joined thereto. The rear wheel suspension device 18D also includes a rear cushion unit 26, which is arranged in a state that the rear cushion 26 is inclined in the rearward and upward direction.

The knuckle member 25E integrally includes rear wheel support portions 25Ea, 25Eb, which are arranged on both sides of the rear wheel WR so as to pivotally support the rear wheel WR. Arm portions 25Ec, 25Ed respectively extend frontwardly from the respective rear wheel support portions 25Ea. 25Eb. A joining portion 25Ee connects front end portions of the arm portions 25Ec, 25Ed. A lower arm portion 25Ef projects obliquely in the frontward and downward direction from a lower portion of the rear wheel support portion 25Ea, while having a length shorter than a length of the arm portions 25Ec, 25Ed. The knuckle member 25E is formed in a substantially U-shape as viewed in a plan view.

Further, a rear end portion of the upper arm member 22C is joined to the knuckle member 25E in front of the rear wheel support members 25Ea, 25Eb of the knuckle member 25E and outside an outer periphery of the rear wheel WR. In the fourth embodiment, a rear end portion of the upper arm member 22C is joined to a center portion of the joining portion 25Ee of the knuckle member 25E by way of the joining shaft 47. Furthermore, a rear end portion of the lower arm member 24D is joined to lower portions of the rear wheel support portions 25Ea, 25Eb of the knuckle member 25E by way of the joining shaft 48. Furthermore, in the fourth embodiment, the rear end portion of the lower arm member 24D is joined to a lower arm portion 25Ef, which projects obliquely in the frontward and downward direction from the lower portion of the rear wheel support portion 25Ea by way of the joining shaft 48.

One end of a rear cushion unit 26 is joined to one of the upper arm member 22C and the lower arm member 24D, that is, to the upper arm member 22C in the fourth embodiment. On the other hand, another end of the rear cushion unit 26 is joined to one of another arm member, that is, the lower arm member 24D and the knuckle member 25E. In the fourth embodiment, another end of the rear cushion unit 26 is joined to the lower arm member 24D.

According to the constitution of the rear wheel suspension device 18D of the fourth embodiment, it is possible to concentrate the acquisition of rigidity of the vehicle body frame F on shaft support portions of the front end portions of the upper arm member 22C and the lower arm member 24D. Hence, it is possible to make the acquisition of extra rigidity of the vehicle body frame F unnecessary. Furthermore, it is possible to avoid an increase of the number of parts, while obtaining a progressive cushion property without requiring additional parts such as link members.

Furthermore, the joining portion of the upper arm member 22C and the knuckle member 25E is arranged outside the outer periphery of the rear wheel WR as viewed in a side view. Hence, the knuckle member 25E can be formed by integrally joining the rear wheel support portions 25Ea, 25Eb, which are arranged on both left and right sides of the rear wheel WR. Accordingly, it is possible to arrange the rear cushion unit 26 at a center position C3 (see FIG. 3) in the lateral direction of the vehicle body frame F.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension device of a motorcycle, comprising:
a knuckle member, the knuckle member including:
 a rear wheel support portion for pivotally supporting a rear wheel of the motorcycle;
 a lower arm portion inclined downwardly from the rear wheel support portion toward a front end of the motorcycle; and
 an upper arm portion inclined upwardly from the rear wheel support portion toward the front end of the motorcycle;
an upper arm member, the upper arm member having a front end portion thereof pivotally supported on a vehicle body frame and extending rearwardly, a rear end portion of the upper arm member being rotatably joined to the upper arm portion of the knuckle member;
a lower arm member, the lower arm member having a front end portion thereof pivotally supported on the vehicle body frame and extending rearwardly below the upper arm member, a rear end portion of the lower arm member being rotatably joined to the lower arm portion of the knuckle member, wherein the rear end portion of one of the upper arm member and the lower arm member extends to inside an outer periphery of the rear wheel of the motorcycle as viewed in a side view of the motorcycle, and is joined to the knuckle member, the one of the upper arm member and the lower min member being defined as a swing arm, and the other one of the upper arm member and the lower arm member being defined as the other arm; and
a rear cushion unit, one end of the rear cushion unit being joined to the swing arm and the other end of the rear cushion unit being joined to either the other arm or one of the upper arm portion and the lower arm portion of the knuckle member that is joined to the other arm,
wherein a joint of the rear end portion of the other arm and a corresponding one of the lower arm portion and the upper arm portion of the knuckle member is located outside the outer periphery of the rear wheel of the motorcycle as viewed in the side view of the motorcycle.

2. The rear wheel suspension device of a motorcycle according to claim 1, wherein a joint of the other end of the rear cushion unit and either the other arm or one of the upper arm portion and the lower arm portion of the knuckle member is arranged outside the outer periphery of the rear wheel of the motorcycle as viewed in the side view of the motorcycle.

3. The rear wheel suspension device of a motorcycle according to claim 1, rotational driving force of an engine is transmitted to the rear wheel by a rear wheel drive shaft, and the rear wheel drive shaft is arranged, as viewed in the side view of the motorcycle, between the swing min and the one of the upper arm portion and the lower arm portion of the knuckle member that is joined to the other arm.

4. The rear wheel suspension device of a motorcycle according to claim 3, wherein the rear wheel drive shaft includes a plurality of shafts and a plurality of universal joints, and one of the universal joints is arranged, as viewed in the side view of the motorcycle, between the swing arm and the one of the upper arm portion and the lower arm portion of the knuckle member that is joined to the other arm.

5. The rear wheel suspension device of a motorcycle according to claim 4, wherein a Neidhart mechanism is provided on one of the shafts of the rear wheel drive shaft, and the one of the shafts of the rear wheel drive shaft is arranged, as viewed in the side view of the motorcycle, between the swing arm and the one of the upper arm portion and the lower arm portion of the knuckle member that is joined to the other arm.

6. The rear wheel suspension device of a motorcycle according to claim 5, wherein the swing arm is the upper arm member and the other arm is the lower arm member, and the rear cushion unit is inclined upwardly in a frontward direction of the motorcycle and jointed to the upper arm member.

7. The rear wheel suspension device of a motorcycle according to claim 4, wherein the swing arm is the upper arm member and the other arm is the lower arm member, and the rear cushion unit is inclined upwardly in a frontward direction of the motorcycle and jointed to the upper arm member.

8. The rear wheel suspension device of a motorcycle according to claim 3, wherein the swing arm is the upper arm member and the other arm is the lower arm member, and the rear cushion unit is inclined upwardly in a frontward direction of the motorcycle and jointed to the upper arm member.

9. The rear wheel suspension device of a motorcycle according to claim 1, wherein the swing arm is the upper arm member and the other arm is the lower arm member, and the rear cushion unit is inclined upwardly in a frontward direction of the motorcycle and jointed to the upper arm member.

10. The rear wheel suspension device of a motorcycle according to claim 1, wherein the entire other arm does not extend to inside the outer periphery of the rear wheel of the motorcycle as viewed in the side view of the motorcycle.

11. The rear wheel suspension device of a motorcycle according to claim 1, wherein a joint of the rear end portion of the swing arm and a corresponding one of the lower arm portion and the upper arm portion of the knuckle member is located inside the outer periphery of the rear wheel of the motorcycle as viewed in the side view of the motorcycle.

* * * * *